Patented May 19, 1931

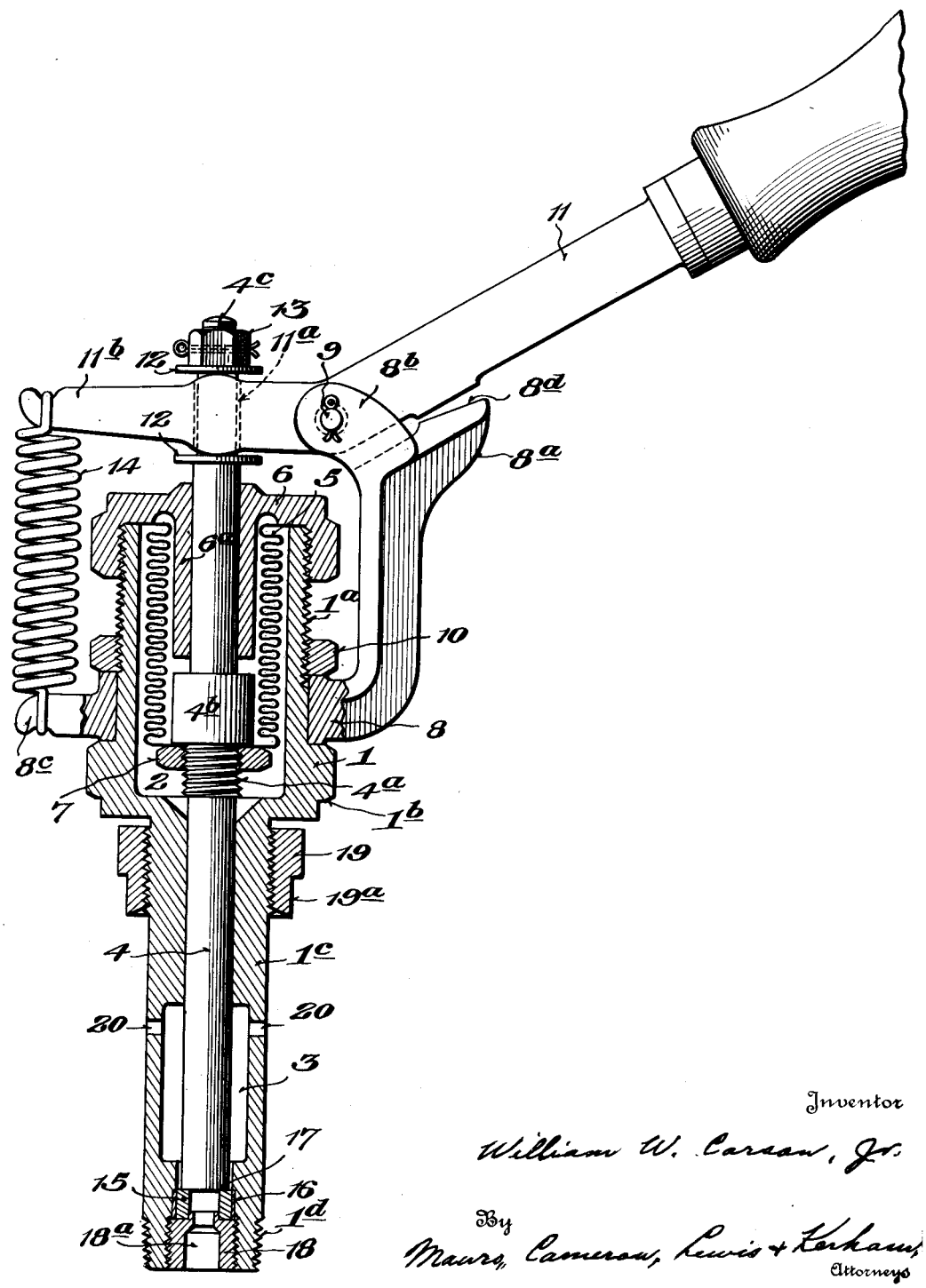

1,806,447

UNITED STATES PATENT OFFICE

WILLIAM W. CARSON, JR., OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

STEAM VALVE

Application filed September 28, 1925. Serial No. 59,219.

This invention relates to steam valves and more particularly to manually operable valves for controlling the flow of steam to pressing machines.

Manually operable valves of the type commonly used in pressing machines to control the flow of steam to the pressing board usually include resilient means for normally maintaining the valve in closed position, and it has been customary to construct valves of this character in such a manner that the resilient means occupied a position within the valve casing. Due to the high temperature and the repeated use to which the valves are ordinarily subjected, it frequently becomes necessary to renew the resilient means and, due to the inaccessible position of the latter, it was necessary, for this purpose, to disassemble the valve structure. Furthermore, it has been customary to employ a valve seat of metal, or other hard material, integral with the valve body, the valve proper being constituted by a part which is integrally formed or suitably attached to the end of the valve stem. In order to insure tight closing of the valve, a disk of soft material is often attached to the movable valve stem. When either construction is employed and it is desired to renew the valve because of wear, it is necessary to disassemble the device.

An object of the present invention is to provide a novel valve structure for pressing machines wherein the resilient means employed for normally maintaining the valve in closed position is positioned exteriorly of the valve casing and is adapted for ready renewal without the necessity of disassembling the rest of the structure.

A further object of the invention is to provide a novel valve structure for pressing machines wherein the valve seat, which is preferably of relatively soft material, may be readily removed and renewed without disassembling the main portions of the valve structure. These and other objects will be pointed out more fully hereinafter.

The invention will be readily understood by reference to the accompanying drawing illustrating one form which the inventive idea may assume. This drawing, however, is for the purpose of illustration only and is not to be taken as a definition of the limits of the invention, reference being had to the appended claims for this purpose.

In the form shown on the drawing, 1 is a valve casing or housing which is generally cylindrical in shape, and which preferably comprises an enlarged, outer, exteriorly threaded portion 1a, an intermediate portion 1b which may be polygonal in outline, and an inner reduced portion 1c which is exteriorly threaded at the extremity thereof, as at 1d. An opening extends throughout the length of the casing 1 and at the outer end thereof this opening is enlarged to form a chamber 2. A second chamber 3 is provided in the inner reduced portion 1c.

Extending through the opening in the casing 1 is a valve stem 4 which is threaded intermediate the ends thereof as at 4a. Immediately above the threaded portion, the stem is enlarged to provide a shouldered portion 4b, while the upper end of the stem 4 projects beyond the upper end of the casing 1. An expansible and collapsible bellows or flexible wall 5 of any suitable construction and material is mounted within the chamber 2 of the casing 1, and the flanged upper end thereof is clamped in engagement with the upper end of the casing 1 by means of a cap nut 6 which has threaded engagement with the exteriorly threaded portion 1a of the housing 1. The cap nut 6 is preferably provided with an inwardly extending tubular portion 6a which surrounds and guides the upper end of the valve stem 4. The lower end of the flexible wall 5 is clamped between the shoulder formed by the enlarged portion 4b of the valve stem and a nut 7 screwed onto the threaded portion 4a of the valve stem.

Surrounding the casing 1 and bearing against the upper surface of the polygonal portion 1b thereof, is a bracket 8 provided with an upwardly extending arm 8a that terminates at a point above the end of the housing 1 and which is provided with one or more ears or lugs 8b having suitable openings therein to receive a pivot pin 9. The bracket 8 may be rigidly held in position against the portion 1b by means of a nut 10 threaded onto the upper end 1a of the housing.

A handle 11 is mounted for pivotal movement relative to the bracket arm 8a, by means of the pin 9, and is provided with an opening 11a through which loosely extends the upper reduced end 4c of the valve stem 4. Movement of the handle 11 about the pin 9 is imparted to the stem 4 by means of washers 12 positioned on the valve stem immediately above and below the opening 11a in the arm 11, and in contact with the latter. The lower washer 12 is held in engagement with the arm 11 by means of a suitable shoulder formed on the valve stem 4 and the upper washer 12 is retained in position by means of a nut 13 engaging the threaded reduced end 4c of the valve stem and if desired locked thereon, as by a cotter pin.

Projecting from the bracket 8, on the side opposite from the bracket arm 8a, is a finger 8c having a notch in the lower edge thereof, which finger is in vertical alinement with a notched finger 11b that is preferably formed integral with the handle 11. A suitable resilient member, such as a tension coil spring 14, is mounted with its opposite ends in engagement with the fingers 8c and 11b respectively. Preferably, the bracket arm 8a is provided with a projecting portion 8d which constitutes a stop for limiting pivotal movement of the handle 11.

A removable valve seat, which is preferably formed of composition or other suitable relatively soft material, is provided for the valve within the housing. As shown, this seat is constituted by an annular member 15 which is positioned in a recess in, and adjacent to the inner end of, the housing 1. Preferably, member 15, which may be formed of composition material, is surrounded by a brass ferrule 16. The inner end of the valve stem 4 constitutes the valve and coacts with the annular seat 15 to control the flow of steam.

In order that the valve seat 15 may be readily removed when worn and without the necessity of disassembling the main portions of the valve interior, there is preferably provided a tubular bushing or plug 18 having an outer diameter which is at least as large as the diameter of the member 15, and which is threaded into the inner end of the housing 1 into engagement with the seat 15. The latter is thus securely held against the end wall of its recess in the valve body by the tubular bushing or retaining plug 18. If desired, the plug 18, which is of tubular form, may be provided at the inner end thereof with a key wrench hole 18a and with an annular shoulder 18b which bears against the inner annular surface of the valve seat 15. Steam permitted to escape past the valve and valve seat 15, flows through the tubular plug 18 as hereinafter explained.

The valve structure is adapted to be inserted in the steam casing of a pressing machine of a well known type (not shown), having upper and lower walls, the exteriorly threaded lower end 1d of the housing 4 being threaded into one of the walls. A wrench may be applied to the polygonal portion 1b of the housing for this purpose. A steam-tight joint may be formed at the point where the housing 1 passes through the other wall by means of a packing nut 19, provided with a packing surface 19a, that may be threaded on the housing. Steam pressure is applied to this casing, between said upper and lower walls, and steam passes through openings 20 into the chamber 3 in the housing 1. Normally, spring 14 acts through the finger 11b and lower washer 12 to maintain the valve on the seat 15, whereby flow of steam through the opening 18a is prevented. If pivotal movement be imparted to the handle 11 to force the valve stem 4 upwardly against the tension of spring 14, the steam flows past the valve seat 15 and out the opening 18a. Upon release of the handle 11, the spring 14 automatically closes the valve. The distance which the valve may be opened is limited by engagement of the handle 11 with the shoulder 8d formed on the bracket arm 8a. The flexible wall 5 forms a steam-tight joint to prevent escape of steam from the outer part of the housing.

It will thus be seen that there is provided a steam valve for pressing machines of simple and rugged construction. The spring 14 may be readily renewed without disassembly of the valve structure, and if it is desired to replace valve seat 15 it is only necessary to remove the valve structure from the steam casing, whereupon the bushing 18 may be removed to gain access to the seat 15 for replacement. It is therefore unnecessary to disassemble the valve for the usual repairs which must be made to a device of this character.

While only one embodiment of the inventive idea has been illustrated in the drawing, it is to be understood that various changes may be made in the details of construction without departing from the invention defined in the appended claims.

What is claimed is:—

1. In a steam valve for pressing machines, in combination, a housing, valve means movably mounted in the housing, a valve seat in the housing composed of material softer than said valve means whereby it will take the wear arising from the cooperation of said valve means and said valve seat, means separate from said valve seat for removably securing said seat in the housing, said seat being removable to permit replacement of said seat without displacing any other part of the valve structure, means for opening the valve, and resilient means positioned exteriorly of the housing and engaging said last-named means for normally maintaining the valve in closed position, said resilient means being removable without removal of any other parts of the valve structure.

2. In a steam valve for pressing machines, in combination, a housing, valve means in the housing for controlling the flow of steam, a bracket having an arm secured to said housing, an operating member pivoted to said bracket and having engagement with the valve means, and an exterior tension spring readily detachable from the bracket arm and operating member for normally maintaining said valve means in closed position, said bracket cooperating with said operating member to limit the opening movement of the valve.

3. In a steam valve for pressing machines, a housing having an opening therethrough, a bracket secured to the housing, a handle pivoted to said bracket and having an opening therein, a valve having a stem extending through the openings in said housing and handle and operatively engaged with the latter, and a tension spring detachably secured to the handle and bracket exteriorly of the housing for normally maintaining the valve on its seat, said bracket cooperating with said handle to limit the opening movement of the valve stem.

4. In a steam valve for pressing machines, a housing, a valve having a stem movably mounted in the housing, said stem projecting through an opening in said housing, a flexible wall surrounding a portion of said stem, means for clamping one end of the wall to said housing, means for clamping the opposite end of the wall against said stem, a valve seat cooperating with the inner end of said valve stem, means for removably securing said seat in an opening in said housing opposite to said first-named opening, and means for operating said valve stem cooperating with the exteriorly projecting end of said valve stem.

5. In a steam valve for pressing machines, a housing, a bracket having a notched finger projecting therefrom secured to the housing, a valve within the housing having a stem projecting exteriorly of the housing, a valve seat for the valve within the housing, a handle pivoted to said bracket and secured to the projecting portion of said stem, said handle having a notched finger, exterior resilient means detachably engaged in the notches of said fingers for normally maintaining the valve in closed position, and means for clamping the bracket to the housing, said means being adjustable to relieve the tension of the resilient means and facilitate its removal.

6. In a steam valve for pressing machines, a housing, a bracket secured to the housing, said bracket being provided with an arm, a valve having an elongated stem slidably mounted in the housing, a handle pivotally secured to said arm and having engagement with said stem, said arm having a projection constituting a stop for limiting pivotal movement of the handle, and a readily detachable tension spring secured to the handle and bracket for normally maintaining said valve in closed position.

7. In a steam valve for pressing machines, in combination, a housing having an opening therethrough, an elongated valve member slidably mounted in said opening projecting exteriorly through one end of said opening, the opposite end of the member constituting a valve, said housing having a recess in the corresponding end of said opening, with a diameter at least equal to that of the valve, an annular seat for the valve mounted in said recess, a plug having an opening therethrough for removably securing said seat in said recess, the diameter of said plug being not less than the diameter of the seat whereby said seat may be removed upon removal of said plug without displacement of any other element of the valve structure, and means for opening and closing the valve, whereby removal of the plug will allow the valve to loosen and dislodge the seat.

8. In a steam valve for pressing machines, in combination, a housing, valve means including a stem in the housing for controlling the flow of steam, a bracket secured to the housing, a handle pivotally secured to said bracket at one side of said stem, said handle having an opening through which said stem projects, a readily detachable tension spring attached to the handle on the opposite side of the stem and to said bracket, and means carried by the stem for preventing relative movement between the handle and stem, said bracket being adjustable to relieve the tension of the spring and facilitate its removal and replacement.

9. In a steam valve, a cylindrical housing having an external shoulder intermediate its length, and a screw thread extending from adjacent the shoulder to the end of the housing, a bracket seated on the housing adjacent said shoulder, a nut threaded on the housing and adapted to clamp the bracket against the shoulder, a valve stem within the housing, a flexible tubular member between the valve stem and the housing, means for clamping one end of the tubular member to the valve stem, and a cap threaded on the housing clamping the other end of the tubular member to the housing.

In testimony whereof I have signed this specification.

WILLIAM W. CARSON, Jr.